United States Patent
Yang et al.

(10) Patent No.: US 9,265,019 B2
(45) Date of Patent: Feb. 16, 2016

(54) STORAGE OF BASE STATION IDENTITY CODE (BSIC) TIMING

(71) Applicant: QUALCOMM Incorporated, San Diego, CA (US)

(72) Inventors: Ming Yang, San Diego, CA (US); Qingxin Chen, San Diego, CA (US); Tom Chin, San Diego, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 142 days.

(21) Appl. No.: 14/027,826

(22) Filed: Sep. 16, 2013

(65) Prior Publication Data

US 2015/0078347 A1 Mar. 19, 2015

(51) Int. Cl.
*H04W 56/00* (2009.01)
*H04W 36/00* (2009.01)

(52) U.S. Cl.
CPC .......... *H04W 56/00* (2013.01); *H04W 36/0022* (2013.01); *H04W 56/0015* (2013.01)

(58) Field of Classification Search
CPC ............ H04W 36/0022; H04W 56/00; H04W 56/0015
USPC ........................................................ 370/252
See application file for complete search history.

(56) References Cited

U.S. PATENT DOCUMENTS

| | | | |
|---|---|---|---|
| 7,649,869 B2 | 1/2010 | Mittal et al. | |
| 7,986,661 B2 | 7/2011 | Bhattacharjee et al. | |
| 8,340,661 B2 | 12/2012 | Boixadera et al. | |
| 2005/0032542 A1* | 2/2005 | Wilborn | H04W 36/0088 455/525 |
| 2005/0180351 A1 | 8/2005 | Peric | |
| 2007/0037601 A1* | 2/2007 | Mittal | H04W 24/10 455/525 |
| 2012/0314589 A1 | 12/2012 | Chen et al. | |
| 2014/0089272 A1* | 3/2014 | Biswas | G06F 17/30303 707/692 |
| 2014/0161116 A1* | 6/2014 | Das | H04W 56/0035 370/350 |
| 2014/0213261 A1* | 7/2014 | Das et al. | 455/437 |

OTHER PUBLICATIONS

3GPP TS 25.133: "3rd Generation Partnership Project; Technical Specification Group Radio Access Network; Requirements for support of radio resource management," Version 10.4.0, Release 10, Dec. 2011, pp. 268.

International Search Report and Written Opinion—PCT/US2014/052153—ISA/EPO—Nov. 5, 2014.

(Continued)

*Primary Examiner* — Charles C Jiang
*Assistant Examiner* — Thad Defauw
(74) *Attorney, Agent, or Firm* — Seyfarth Shaw LLP

(57) ABSTRACT

A method and apparatus for wireless communication stores synchronization channel (SCH) timing for each identified Global System for Mobile Communications (GSM) cell. The stored SCH timing is used to perform base station identity code (BSIC) reconfirmation for an identified GSM cell without frequency correction channel (FCCH) tone detection and initial BSIC confirmation. The stored SCH timing is maintained across a plurality of user equipment (UE) states.

20 Claims, 7 Drawing Sheets

(56) References Cited

OTHER PUBLICATIONS

Nokia: "UTRAN-GERAN handovers", 3GPP Draft; R2-031396, 3rd Generation Partnership Project (3GPP), Mobile Competence Centre; 650, Route Des Lucioles; F-06921 Sophia-Antipolis Cedex; France, vol. RAN WG2, no. Paris, France; May 25, 2003, XP050123714,[retrieved on May 25, 2003].

Renesas Mobile Europe Ltd: "Simulations of reselection from UTRA to E-UTRA", 3GPP Draft; R4-114258, 3rd Generation Partnership Project (3GPP), Mobile Competence Centre; 650, Route Des J Lucioles; F-06921, Sophia-Anti Polis Cedex; France, vol. RAN WG4, no. Athens, Greece; Aug. 22, 2011, Aug. 17, 2011,XP050543356.

* cited by examiner

STORAGE OF BASE STATION IDENTITY CODE (BSIC) TIMING

BACKGROUND

1. Field

Aspects of the present disclosure relate generally to wireless communication systems, and more particularly, to utilizing stored timing information for base station identity code (BSIC) reconfirmation procedures.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes storing synchronization channel (SCH) timing for each identified Global System for Mobile Communications (GSM) cell. Base station identity code (BSIC) reconfirmation is performed using the stored SCH timing for an identified GSM cell without frequency correction channel (FCCH) tone detection and initial BSIC confirmation. The stored SCH timing is maintained across a plurality of user equipment (UE) states.

Another aspect discloses an apparatus including means for storing synchronization channel (SCH) timing for each identified Global System for Mobile Communications (GSM) cell. The apparatus also includes means for performing base station identity code (BSIC) reconfirmation, using the stored SCH timing, for an identified GSM cell without frequency correction channel (FCCH) tone detection and initial BSIC confirmation. The apparatus also includes means for maintaining the stored SCH timing across a plurality of user equipment (UE) states.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of storing synchronization channel (SCH) timing for each identified Global System for Mobile Communications (GSM) cell. The program code also causes the processor(s) to perform base station identity code (BSIC) reconfirmation, using the stored SCH timing, for an identified GSM cell without frequency correction channel (FCCH) tone detection and initial BSIC confirmation. Further, the program code also causes the processor(s) maintain the stored SCH timing across a plurality of user equipment (UE) states.

Another aspect discloses wireless communication having a memory and at least one processor coupled to the memory. The processor(s) is configured store synchronization channel (SCH) timing for each identified Global System for Mobile Communications (GSM) cell. The processor(s) is also configured to perform base station identity code (BSIC) reconfirmation, using the stored SCH timing, for an identified GSM cell without frequency correction channel (FCCH) tone detection and initial BSIC confirmation. Further, the processor(s) is also configured to maintain the stored SCH timing across a plurality of user equipment (UE) states.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
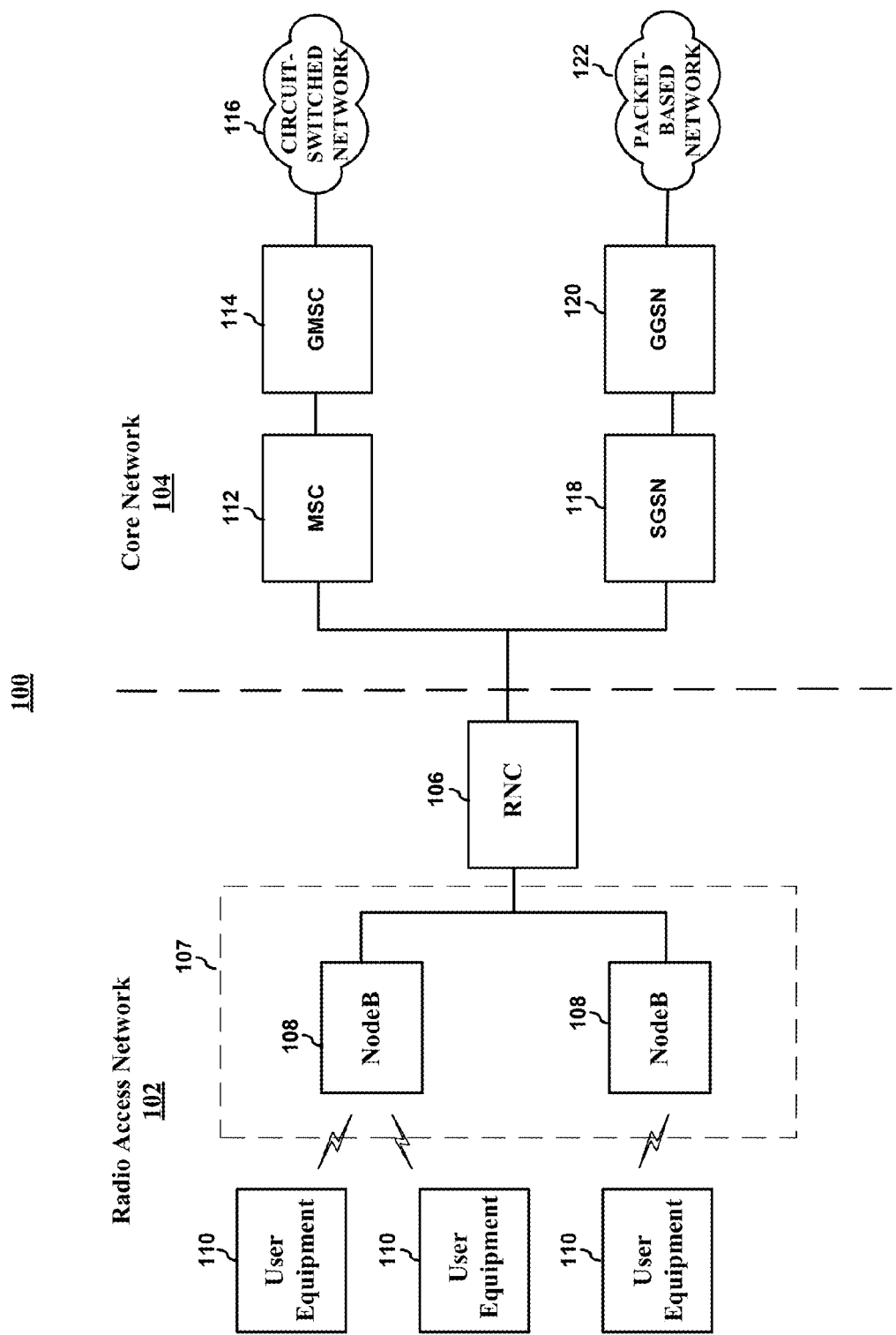
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
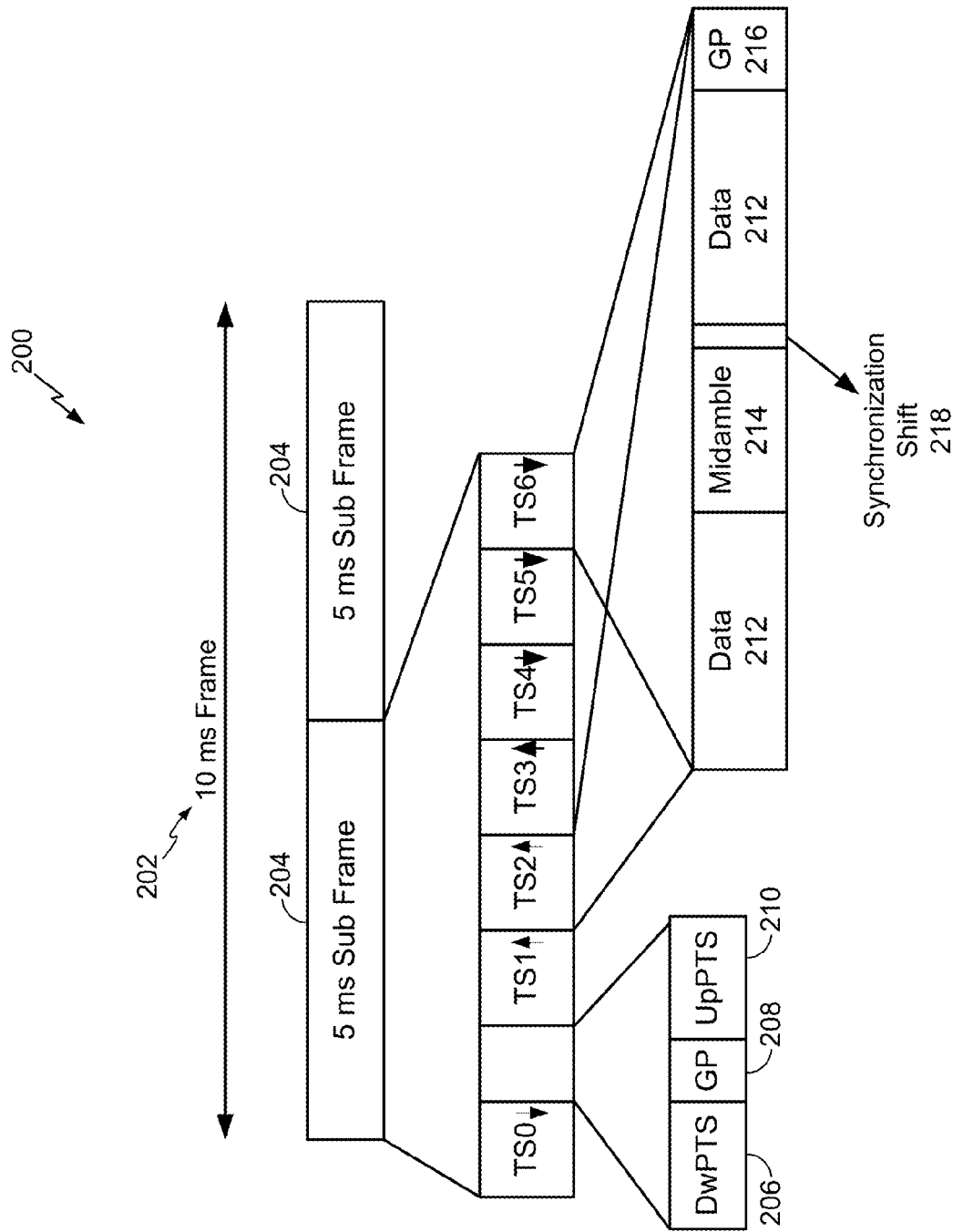
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. SS bits 218 only appear in the second part of the data portion. The SS bits 218 immediately following the midamble can indicate three cases: decrease shift, increase shift, or do nothing in the upload transmit timing. The positions of the SS bits 218 are not generally used during uplink communications.

Figure 3:
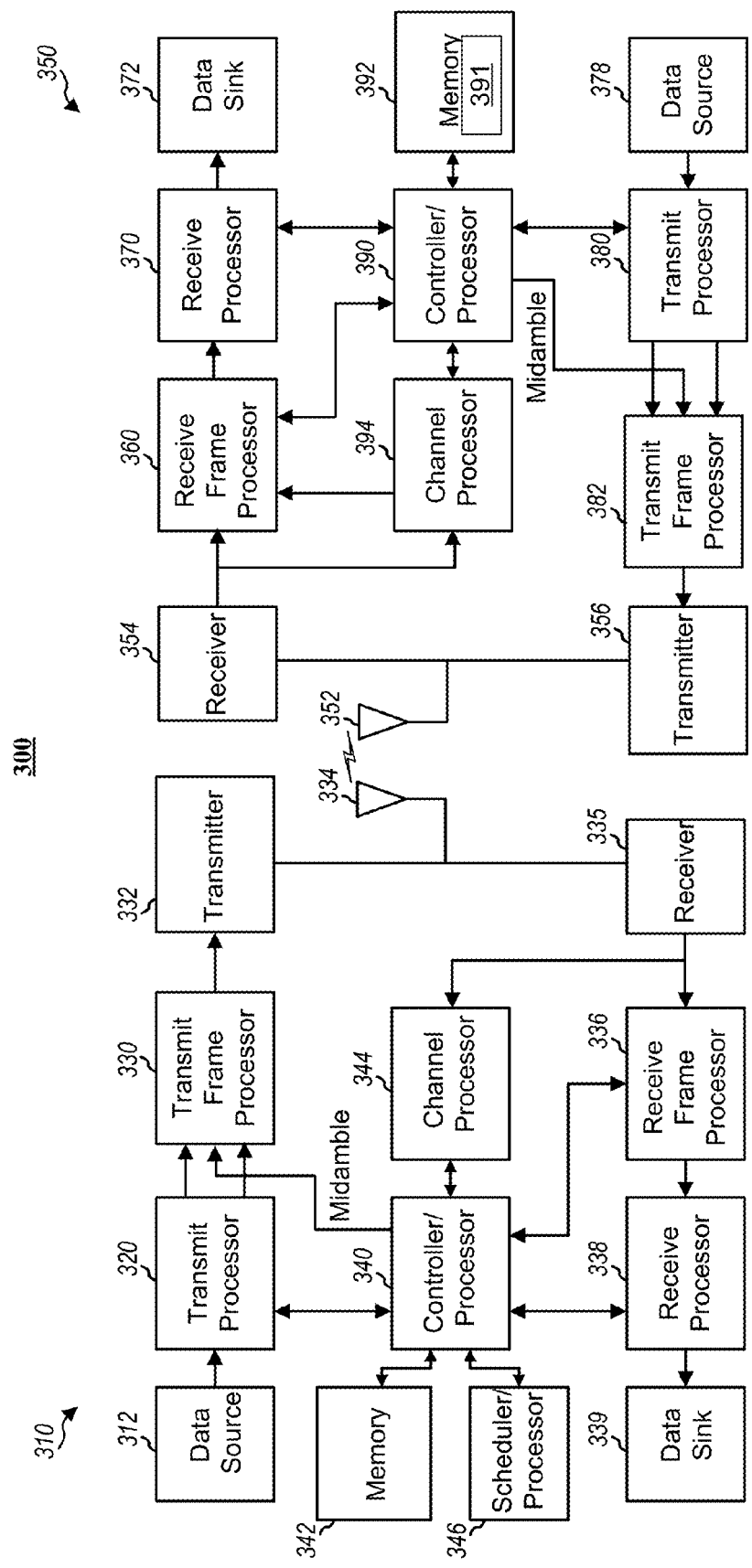
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may include a synchronization channel (SCH) timing module 391 which, when executed by the controller/processor 390, configures the UE 350 to perform IRAT measurement during a handover execution phase. A scheduler/processor 346 at the node B 310 may be used to allocate resources to the UEs and schedule downlink and/or uplink transmissions for the UEs.

Figure 4:
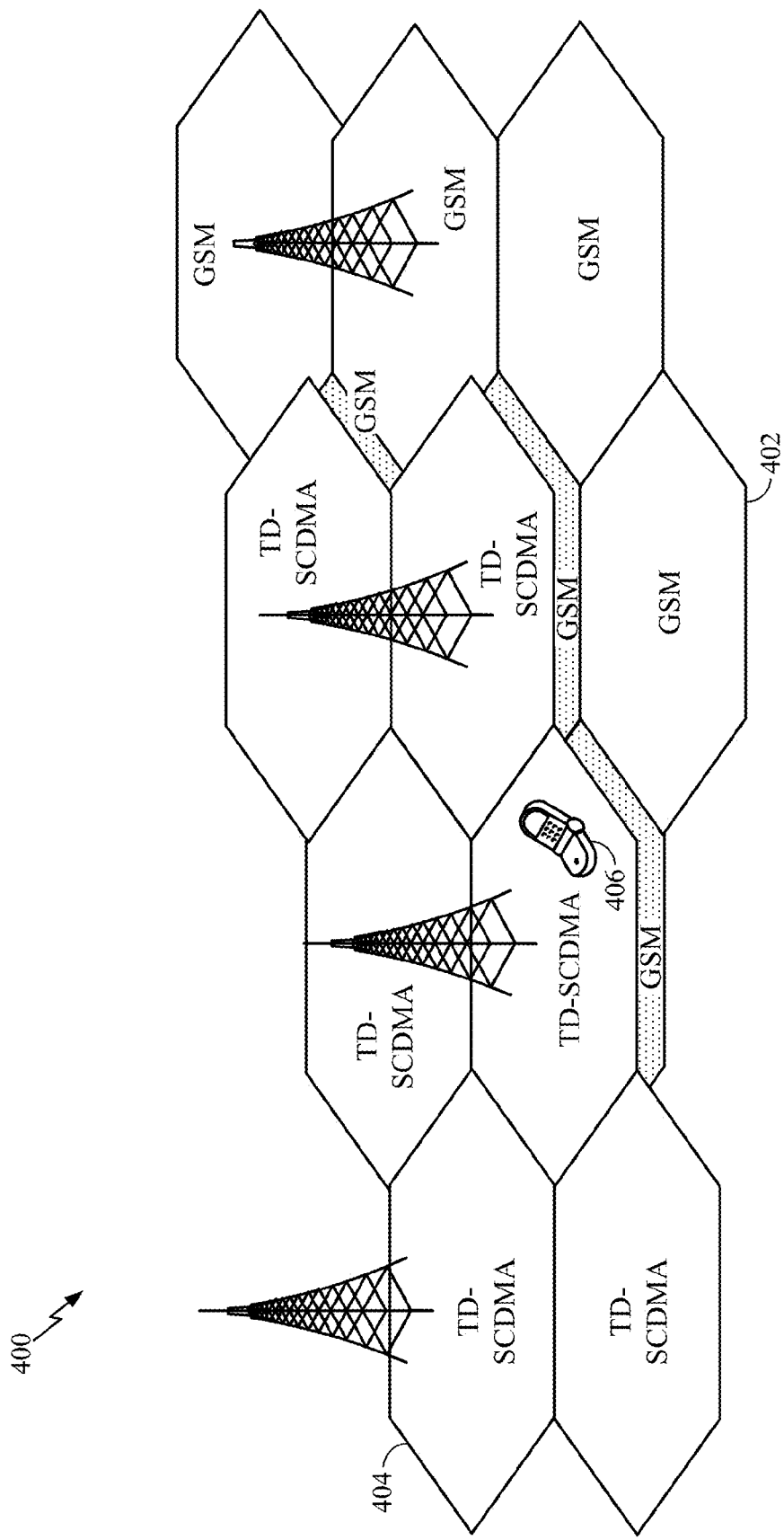
FIG. 4 illustrates network coverage areas according to aspects of the present disclosure.

FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell 404 to the coverage area of a GSM cell 402, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

During the BSIC confirmation/reconfirmation process, the UE triggers the initial BSIC identification within the available idle time slots when the UE is in TD-SCDMA dedicated channel (DCH) mode. The initial base station identity code (BSIC) identification includes searching for the BSIC and decoding the BSIC for the first time because there is no knowledge about the relative timing between the TDD and GSM cell.

The BSIC of a GSM cell is "verified" (i.e., confirmed) when the UE has decoded the synchronization channel (SCH) of the broadcast channel (BCCH) carrier and has identified the BSIC at least one time (i.e., initial BSIC identification) within a predefined time period. For example, in one aspect, the time period ($T_{identify\_abort}$) may be defined as 5 seconds in length. After the initial BSIC identification, the BSIC is re-confirmed at least once every predefined time period. For example, the predefined time period ($T_{re-confirm\_abort}$) may be defined as 5 seconds. Otherwise the BSIC of the GSM cell is considered as a "non-verified" cell.

The initial timing information is obtained from the initial BSIC identification procedure. Generally, a UE maintains the timing information of at least eight (8) identified GSM cells. The timing information is then updated every time the BSIC is decoded.

The UE aborts the BSIC re-confirmation attempt for a GSM broadcast channel (BCCH) carrier when either the UE fails to decode the BSIC after two successive attempts, or when the UE has not been able to re-confirm the BSIC for a GSM BCCH carrier within the predefined period (e.g., $T_{re-confirm\_abort}$). After aborting the BSIC re-confirmation attempt, the GSM BCCH carrier is treated as a new GSM BCCH carrier with an unidentified BSIC and the UE returns to the initial BSIC decoding procedure for that GSM BCCH carrier.

It may take a lengthy period of time, (e.g. up to five seconds), to perform the initial BSIC identification procedure because the relative timing between the TD-SCDMA serving cell and GSM neighbor cells are unknown. The initial BSIC identification procedure includes fully blind frequency correction channel (FCCH) tone detection. The tone detection is performed to determine the subframe boundary of the GSM cell.

Figure 5:
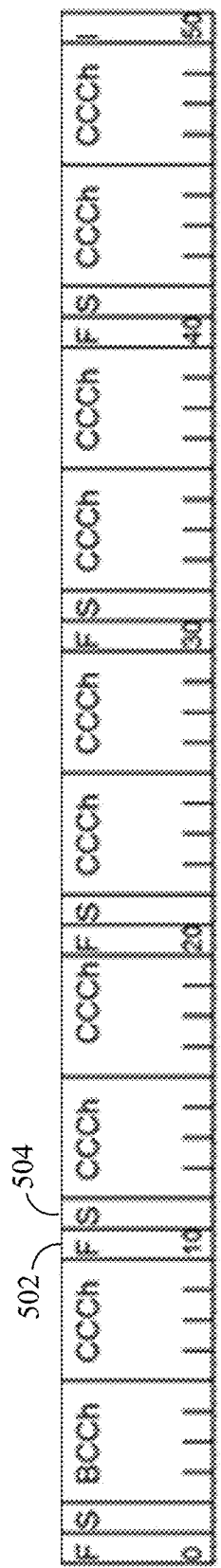
FIG. 5 is a block diagram illustrating a GSM frame cycle.

FIG. 5 illustrates an example GSM frame cycle. Each GSM frame cycle includes a frequency correction channel 502, synchronization channel (SCH) 504, a broadcast control channel (BCCH), a common control channel (CCCH), and an idle time slot I. The numbers at the bottom of the block diagram 500 are in seconds. In one configuration, each block of an FCCH 502 includes eight time slots, with only the first timeslot (or TS0) used for FCCH tone detection.

The timing of the channels shown in FIG. 5 may be determined in a BSIC identification procedure. The BSIC identification procedure may include detection of the FCCH 502, based on a fixed bit sequence that is carried on the FCCH 502. FCCH tone detection is performed to find the relative timing between multiple RATs. The FCCH tone detection may be based on the SCH 504 being either a first number of frames or a second number of frames later in time than the FCCH 502. Once the location of the FCCH 502 is determined, the location of the synchronization channel (SCH) 504 may then be determined. The SCH 504 carries the BSIC. The location of the synchronization channel (SCH) 504 is either 11+n*10 or 12+n*10 GSM frames later then the FCCH 502. The idle time slots may be scheduled to decode the SCH when it falls fully within a measurement gap or an idle time slot.

Those skilled in the art will appreciate the relative timing may be between an identified GSM cell and a second RAT, between the identified GSM cell and the UE internal timing, or between the identified GSM cell and a global positioning system (GPS) timing.

When a UE is close to GSM neighbor cells, the BSIC of these GSM cells is typically successfully "verified." When the UE moves away from these same GSM cells, and when the UE fails to decode the BSIC after two successive attempts, each of the GSM BCCH carriers are treated as a new GSM BCCH carrier with an unidentified BSIC and unknown relative timing between the TD-SCDMA and GSM cells. When the UE moves back to the same locations (close to these GSM cells), the initial BSIC identification takes a long time because of the fully blind searching.

One aspect of the present disclosure is directed to long-term storage of BSIC timing information. Each GSM cell has a relative timing to the TD-SCDMA cell. In one aspect, each time the UE successful confirms/re-confirms BSIC, the UE stores the relative BSIC timing of neighbor cells. Then, the next time the UE performs the BSIC identification of a neighbor cell, the UE identifies the neighbor cell by a frequency number identification. The UE verifies whether the particular frequency number is stored in a database/memory to determine whether the BSIC has been used before. If it is stored, the UE utilizes the stored timing information to decode the SCH, and can skip the FCCH tone detection procedure. In other words, the UE skips the tone detection phase, and instead reconfirms the BSIC based on the stored timing information.

If the stored timing information is incorrect, the UE aborts the BSIC re-confirmation attempt(s). In one example, the stored timing information is incorrect when the UE fails to decode the BSIC after two successive attempts or when the UE has not been able to re-confirm the BSIC.

Thus, according to aspects of the present disclosure, the relative timing between the TD-SCDMA serving cell and GSM neighbor cells are recorded. In particular, the relative timing of up to N GSM cells is recorded. When the measured received signal strength indicator (RSSI) of the N GSM cells is above a predefined threshold, the UE utilizes the recorded timing information plus an uncertain time margin to schedule idle time slots for the initial GSM BSIC identification rather than blindly searching. The uncertain time margin is utilized to compensate for drifting in timing, incorrect timing, etc.

In another aspect, if the BSIC confirmation procedure fails, then the memory is cleared of the stored GSM timing information for that cell. In yet another aspect, the RSSI measurement may be detected using the absolute radio frequency channel number (ARFCN).

By storing the relative timing, the timing can be available during power up, and also after releasing the serving cell. In one configuration, the storing occurs when the UE is in idle mode. The storage can be a long term storage. Regardless of whether the storage is long term storage, the relative timing can be stored across UE states. For example, the storing can occur when the UE is in idle mode, and can be maintained when the UE powers off and then powers back on.

Figure 6:
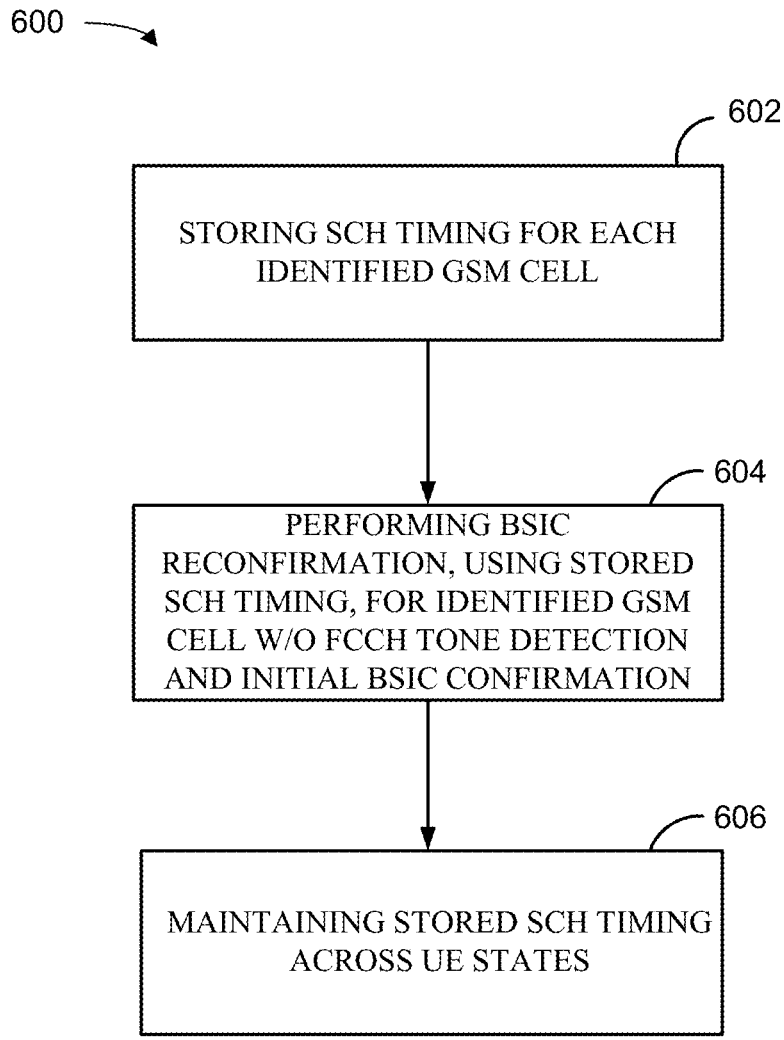
FIG. 6 is a block diagram illustrating a method for utilizing stored BSIC timing information according to one aspect of the present disclosure.

FIG. 6 illustrates a wireless communication method 600 according to one aspect of the present disclosure. In block 602, a UE stores synchronization channel (SCH) timing for each identified GSM cell. In block 604, the UE uses the stored SCH timing to perform base station identity code (BSIC) reconfirmation for an identified GSM cell without FCCH tone detection and initial BSIC confirmation. The stored SCH timing is maintained across multiple user equipment (UE) states. The UE states may include a radio resource control (RRC) idle mode in which there is no connection. The UE states in the RRC connected mode, in order of decreasing power consumption, are dedicated channel (DCH), forward access channel (FACH), and paging channel (PCH).

Figure 7:
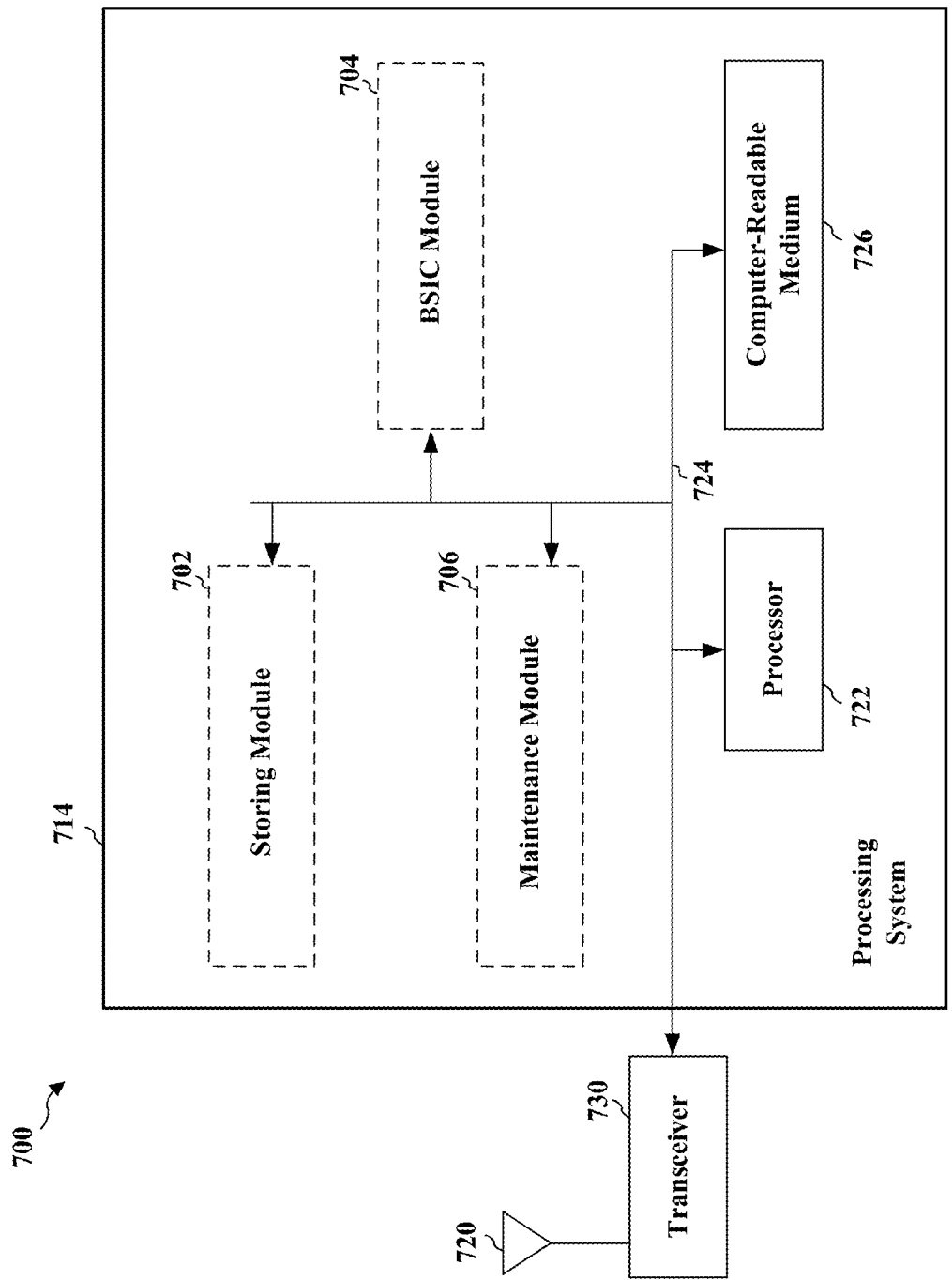
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing system 714 for storing SCH timing information. The system 714 may be implemented with a bus architecture, represented generally by the bus 724. The bus 724 may include any number of interconnecting buses and bridges depending on the specific application of the system 714 and the overall design constraints. The bus 724 links together various circuits including one or more processors and/or hardware modules, represented by the processor 722, an storing module 702, a BSIC module 704, a maintenance module 706, and the computer-readable medium 726. The bus 724 may also link various other circuits such as timing sources, peripherals, voltage regulators, and power management circuits, which are well known in the art, and therefore, will not be described any further.

The apparatus includes a system 714 coupled to a transceiver 730. The transceiver 730 is coupled to one or more antennas 720. The transceiver 730 enables communicating with various other devices over a transmission medium. The system 714 includes a processor 722 coupled to a computer-readable medium 726. The processor 722 is responsible for general processing, including the execution of software stored on the computer-readable medium 726. The software, when executed by the processor 722, causes the system 714 to perform the various functions described for any particular apparatus. The computer-readable medium 726 may also be used for storing data that is manipulated by the processor 722 when executing software.

The system 714 includes a storing module 702 for storing synchronization channel (SCH) timing for each identified GSM cell. The system 714 also includes a BSIC module 704 for using the SCH timing to perform the BSIC reconfirmation for an identified cell without FCCH tone detection and initial BSIC confirmation. The system 714 also includes a maintenance module 706 for maintaining the SCH timing across multiple UE states. The modules may be software modules running in the processor 722, resident/stored in the computer-readable medium 726, one or more hardware modules coupled to the processor 722, or some combination thereof. The system 714 may be a component of the UE 350 and may include the memory 392, and/or the controller/processor 390.

In one configuration, an apparatus such as a UE is configured for wireless communication including means for storing. In one aspect, the above means may be the controller/processor 390, the memory 392, the SCH timing module 391, the storing module 702, the processor 722, and/or the system 714 configured to perform the functions recited by the aforementioned means. In another aspect, the aforementioned means may be a module or any apparatus configured to perform the functions recited by the aforementioned means.

In one configuration, an apparatus such as a UE is configured for wireless communication including means for performing. In one aspect, the above means may be the antennas 352, the receiver 354, the channel processor 394, the receive processor 370, the transmitter 356, the transmit processor 380, the controller/processor 390, the memory 392, the SCH timing module 391, the BSIC module 704, the processor 722, and/or the system 714 configured to perform the functions recited by the aforementioned means. In another aspect, the aforementioned means may be a module or any apparatus configured to perform the functions recited by the aforementioned means.

In one configuration, an apparatus such as a UE is configured for wireless communication including means for maintaining. In one aspect, the above means may be the controller/processor 390, the memory 392, the SCH timing module 391, the maintenance module 706, the processor 722, and/or the system 714 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA and GSM. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    storing, by a user equipment, synchronization channel (SCH) timing for an identified Global System for Mobile Communications (GSM) cell when a base station identity code (BSIC) is successfully confirmed/reconfirmed for the identified GSM cell during an initial BSIC identification procedure, the initial BSIC identification procedure including frequency correction channel (FCCH) tone detection;
    prior to performing a subsequent BSIC procedure, identifying the GSM cell and determining SCH timing information for the identified GSM cell was previously used and stored by the UE;
    performing the subsequent base station identity code (BSIC) procedure for the identified GSM cell by using the stored SCH timing to decode a SCH and reconfirm the BSIC of the identified GSM cell, and skipping both frequency correction channel (FCCH) tone detection and an initial BSIC confirmation; and
    maintaining the stored SCH timing across a plurality of user equipment (UE) states.

2. The method of claim 1, further comprising clearing stored SCH timing for a selected GSM cell when the subsequent BSIC identification procedure fails to reconfirm the BSIC for the selected GSM cell.

3. The method of claim 1, in which the timing comprises a relative timing between the identified GSM cell and one of a cell of a second RAT, a UE internal timing or a global positioning system (GPS) timing.

4. The method of claim 1, further comprising performing non-blind frequency correction channel (FCCH) tone detection by using the stored SCH timing information to schedule idle time slots.

5. The method of claim 1, in which the UE states comprises at least one of idle mode, a paging channel (PCH) mode, forward access channel (FACH) mode, dedicated channel (DCH) state, and power off.

6. An apparatus for wireless communication, comprising:
means for storing synchronization channel (SCH) timing for an identified Global System for Mobile Communications (GSM) cell when a base station identity code (BSIC) is successfully confirmed/reconfirmed for the identified GSM cell during an initial BSIC identification procedure, the initial BSIC identification procedure including frequency correction channel tone detection;
means for identifying, prior to performing a subsequent BSIC procedure, the GSM cell and determining SCH timing information for the identified GSM cell was previously used and stored;
means for performing the subsequent base station identity code (BSIC) procedure for the identified GSM cell by using the stored SCH timing to decode a SCH and reconfirm the BSIC of the identified GSM cell, and skipping both frequency correction channel (FCCH) tone detection and an initial BSIC confirmation; and
means for maintaining the stored SCH timing across a plurality of user equipment (UE) states.

7. The apparatus of claim 6, further comprising means for clearing stored SCH timing for a selected GSM cell when the subsequent BSIC identification procedure fails to reconfirm the BSIC for the selected GSM cell.

8. The apparatus of claim 6, in which the timing comprises a relative timing between the identified GSM cell and one of a cell of a second RAT, a UE internal timing or a global positioning system (GPS) timing.

9. The apparatus of claim 6, further comprising means for performing non-blind frequency correction channel (FCCH) tone detection by using the stored SCH timing information to schedule idle time slots.

10. The apparatus of claim 6, in which the UE states comprises at least one of idle mode, a paging channel (PCH) mode, forward access channel (FACH) mode, dedicated channel (DCH) state, and power off.

11. A computer program product for wireless communication in a wireless network, comprising:
a non-transitory computer-readable medium having non-transitory program code recorded thereon, the program code comprising:
program code to store synchronization channel (SCH) timing for an identified Global System for Mobile Communications (GSM) cell when the base station identity code (BSIC) timing is successfully confirmed/reconfirmed for the identified GSM cell during an initial BSIC identification procedure, the initial BSIC identification procedure including frequency correction channel tone detection;
program code to identify, prior to performing a subsequent BSIC procedure, the GSM cell and to determine SCH timing information for the identified GSM cell was previously used and stored;
program code to perform the subsequent base station identity code (BSIC) procedure for the identified GSM cell by using the stored SCH timing to decode a SCH and reconfirm the BSIC of the identified GSM cell, and by skipping both frequency correction channel (FCCH) tone detection and an initial BSIC confirmation; and
program code to maintain the stored SCH timing across a plurality of user equipment (UE) states.

12. The computer program product of claim 11, further comprising program code to clear stored SCH timing for a selected GSM cell when the subsequent BSIC identification procedure fails to reconfirm the BSIC for the selected GSM cell.

13. The computer program product of claim 11, in which the timing comprises a relative timing between the identified GSM cell and one of a cell of a second RAT, a UE internal timing or a global positioning system (GPS) timing.

14. The computer program product of claim 11, further comprising program code to perform non-blind frequency correction channel (FCCH) tone detection by using the stored SCH timing information to schedule idle time slots.

15. The computer program product of claim 11, in which the UE states comprises at least one of idle mode, a paging channel (PCH) mode, forward access channel (FACH) mode, dedicated channel (DCH) state, and power off.

16. An apparatus for wireless communication, comprising:
a memory; and
at least one processor coupled to the memory, the at least one processor being configured:
to store synchronization channel (SCH) timing for an identified Global System for Mobile Communications (GSM) cell when the base station identity code (BSIC) is successfully confirmed/reconfirmed for the identified GSM cell during an initial BSIC identification procedure, the initial BSIC identification procedure including frequency correction channel tone detection;
to identify, prior to performing a subsequent BSIC procedure, the GSM cell and to determine SCH timing information for the identified GSM cell was previously used and stored;
to perform the subsequent base station identity code (BSIC) procedure for the identified GSM cell by using the stored SCH timing to decode a SCH and reconfirm the BSIC of the identified GSM cell, and by skipping both frequency correction channel (FCCH) tone detection and an initial BSIC confirmation; and
to maintain the stored SCH timing across a plurality of user equipment (UE) states.

17. The apparatus of claim 16, in which the at least one processor is further configured to clear stored SCH timing for a selected GSM cell when the subsequent BSIC identification procedure fails to reconfirm the BSIC for the selected GSM cell.

18. The apparatus of claim 16, in which the timing comprises a relative timing between the identified GSM cell and one of a cell of a second RAT, a UE internal timing or a global positioning system (GPS) timing.

19. The apparatus of claim 16, in which the at least one processor is further configured to perform non-blind frequency correction channel (FCCH) tone detection by using the stored SCH timing information to schedule idle time slots.

20. The apparatus of claim 16, in which the UE states comprises at least one of idle mode, a paging channel (PCH) mode, forward access channel (FACH) mode, dedicated channel (DCH) state, and power off.

* * * * *